Patented Nov. 4, 1941

2,261,517

UNITED STATES PATENT OFFICE

2,261,517

BONDED ADSORBENT AND PROCESS OF MAKING SAME

Herbert H. Greger, Washington, D. C.

No Drawing. Application September 21, 1938, Serial No. 231,075

7 Claims. (Cl. 252—269)

This invention relates to the bonding of adsorbent materials, and more particularly is an improvement upon the process and product disclosed in United States Patent No. 2,057,414, issued to Southwick W. Briggs and Chester G. Gilbert.

The advantage of bonding adsorbents for certain purposes is well recognized, inasmuch as it obviates the objections to adsorbents in unconsolidated form. For instance, adsorbents in unconsolidated form tend to develop channels, attrition between the individual grains occurs, and classification of the grains and stratification of the bed as a whole takes place.

However, bonding of individual grains of adsorbent presents one serious problem—namely, the bonding agent must not close the pore openings of the granular adsorbent. The above mentioned patent, No. 2,057,414, discloses a means of effecting the bond without obstructing the pore openings of the individual grains. That patent, in general, provides for bonding various adsorbent materials, such as fuller's earth, activated charcoal, activated alumina, etc., by means of a water glass which contains only sufficient water to maintain the same fluid. By using a water glass of such viscosity, the water of solution is abstracted by the adsorbent particles so rapidly that the water glass becomes rigid before it has an opportunity to enter or close the pores of the adsorbent. Furthermore, the abstraction of the solvent from the bonding medium is at such a rate that pores in the bonding medium itself are developed which communicate with those of the adsorbent particles.

While the process disclosed in said patent produces an effective bonded adsorbent, certain disadvantages inhere in the process and in the product. That process depends upon a relatively close control of certain factors and is subject to certain definite conditions. For instance, the viscosity of the bonding medium must be maintained within a very narrow range, which, of course, makes for added expense in equipment and labor, and also results in a certain waste due to defects in the finished products when the critical conditions are departed from. Furthermore, the granular adsorbent used in the patented process is preferably of at least 60 mesh size, thus eliminating the possible use of fines. A further objection to that process has resided in the fact that the filter blocks that have been made in accordance with that process have had a tendency to crack, and granulation (the presence of the adsorbent in an unconsolidated form) has been noticed in the inner sections of the blocks in certain cases.

On the other hand, in my invention, substantial economies are effected in view of the fact that the bonding agent per se is less expensive, the relatively close control of the viscosity of the water glass is not necessary, and I may use grains as fine as 200 mesh. Furthermore, blocks formed in accordance with my invention have been free from cracks, and there has been no evidence of granulation, as above mentioned, in the inner sections of the blocks.

In general, my invention embraces the concept of bonding unconsolidated particles of an adsorbent by means of an agent originally comprising two materials, one a solution and the other a solid which is capable of absorbing the solvent which is used in the solution. More specifically, the solution and the powder are of the same chemical composition, save for the presence of the solvent in the former. In the preferred form, I use a sodium silicate solution and a sodium silicate powder, the two being so proportioned that the viscosity of the mixed silicates is kept sufficiently high to prevent the silicate from entering the pores of the adsorbent.

As in the case of the process disclosed in Patent No. 2,057,414, I preferably, though not necessarily, use in the process a base that is replaceable with the alkali of the sodium silicate, such as zinc oxide.

To illustrate the principle of my invention, I will set forth one specific example. The adsorbent material in this case was fuller's earth of 30–60 mesh, which had been fully activated by roasting at a temperature in the neighborhood of 1100° F. and which had thereafter been kept out of appreciable contact with the air. Two pounds of this fuller's earth was placed in a positive mixer, and to this there was added 1.5 ounces of zinc oxide and 1.5 ounces of anhydrous sodium silicate powder, such as "SSC" brand powder. The fuller's earth, zinc oxide, and sodium silicate powder were thoroughly mixed.

To the mixture of fuller's earth, zinc oxide, and sodium silicate powder, in the proportions indicated above, there was added 1.5 pounds of a sodium silicate solution, such as C brand sodium silicate. I might point out that C brand is a sodium silicate composed of 36% $SiO_2$ and 18% $Na_2O$ of about 59.1° Baumé, having the same $SiO_2$–$Na_2O$ ratio as the "SSC" powder mentioned above, namely 2 to 1. The sodium silicate solution was thoroughly mixed with the dry material to form a tacky mass or mixture.

It will of course be appreciated that the sequence of mixing the several ingredients, the precise sodium silicates mentioned, the adsorbent used, and the amounts specified above may be varied within certain limits and to meet changed conditions. For instance, the amount of the anhydrous powder should be increased as the particle size of the fuller's earth is decreased. Furthermore, more of the anhydrous powder is required when it is coarse than is the case when the powder is relatively fine.

While the above described mixture was in a tacky condition, the mass was suitably molded into the desired shapes. This molding step should follow the mixing step with a minimum of delay, and usually should be within five minutes after the completion of the mixing stage in order to mold the product before rigidity sets up in the batch.

The molded block, after removal from the mold, may stand an hour or so before baking at a temperature in the neighborhood of 500 to 700° C. This baking proceeds for approximately one hour and three quarters, but the actual length of time depends upon the precise temperature and particularly the thickness of the block. This baking stage is for the purpose of completely drying the molded product, reactivating the adsorbent, and causing the zinc oxide to react actively with the sodium silicate to form zinc silicate pseudomorphic.

In the accompanying claims the word "adsorbent" is to be construed as embracing a material that has already been adsorptively activated or a material which, while potentially adsorptive, has not yet actually been activated.

While I have shown and described one embodiment of my invention, I wish it to be understood that I do not confine myself to the precise details herein set forth by way of illustration, as it is apparent that many changes and variations may be made therein, by those skilled in the art, without departing from the spirit of the invention, or exceeding the scope of the appended claims.

I claim:

1. A method of preparing a bonded adsorbent comprising mixing discrete particles of a granular adsorbent material having submicroscopic pores with sodium silicate powder and sodium silicate solution until the entire mix forms a tacky mass, and forming the mass into the desired shape.

2. A method of preparing a bonded adsorbent comprising mixing discrete particles of a granular adsorbent material having submicroscopic pores with anhydrous sodium silicate powder and a metallic oxide adapted to react with sodium silicate, and further mixing with a sodium silicate solution until the entire mix forms a tacky mass, forming the mass into the desired shape, and then baking the shaped product.

3. A method of preparing a bonded adsorbent comprising mixing dehydrated activated fuller's earth with zinc oxide and with an anhydrous sodium silicate powder, and further mixing with a sodium silicate solution, until the entire mix forms a tacky mass, molding the mass into blocks as desired, and then baking the molded block.

4. A method of preparing a bonded adsorbent comprising mixing discrete particles of a granular adsorbent material having submicroscopic pores with sodium silicate powder and sodium silicate solution until the entire mix forms a tacky mass, the said powder and solution having the same $SiO_2$—$Na_2O$ ratio, and then forming the tacky mass into the desired shape.

5. A method of preparing a bonded adsorbent comprising mixing, in the following approximate ratios, 20 parts of activated fuller's earth with 1 part of zinc oxide, 1 part of anhydrous sodium silicate powder and 16 parts of sodium silicate solution, said powder and solution having the $SiO_2$—$Na_2O$ ratio of 2 to 1, agitating the mix to form a tacky mass, molding the tacky mass into blocks as desired, and then baking the molded block.

6. Bonded porous material formed by mixing discrete particles of a granular adsorbent material having submicroscopic pores with sodium silicate powder and a sodium silicate solution.

7. A bonded porous material formed by mixing dehydrated activated fuller's earth with zinc oxide, and an anhydrous sodium silicate powder and a sodium silicate solution.

HERBERT H. GREGER.